United States Patent [19]
Mason, Jr. et al.

[11] 3,961,446
[45] June 8, 1976

[54] BALANCED BOTANICAL GROWTH CONTAINER

[75] Inventors: Stanley I. Mason, Jr.; James E. Richardson, both of Weston, Conn.

[73] Assignee: Simco, Inc., Weston, Conn.

[22] Filed: May 19, 1975

[21] Appl. No.: 578,425

[52] U.S. Cl. .................................... 47/38; 47/17; 47/34.13
[51] Int. Cl.² ............................................. A01G 9/00
[58] Field of Search .................. 47/38, 38.1, 34.13, 47/34, 17, 19

[56] References Cited
UNITED STATES PATENTS

| | | | |
|---|---|---|---|
| 1,142,634 | 6/1915 | Shane | 47/38 |
| 1,627,890 | 5/1927 | Ellis | 47/38 |
| 2,798,335 | 7/1957 | Downey | 47/19 |
| 3,095,670 | 7/1963 | Raab | 47/17 |
| 3,106,801 | 10/1963 | Risacher | 47/17 |
| 3,243,919 | 4/1966 | Carlson | 47/38 |
| 3,451,162 | 6/1969 | Rasmussen | 47/38 X |

*Primary Examiner*—Robert E. Bagwill
*Attorney, Agent, or Firm*—Haynes N. Johnson

[57] ABSTRACT

A low cost, readily assembled container suitable for germinating seeds and supporting plant growth under balanced growth conditions includes a plastic base containing an integral series of germinating/root control means and a series of channels including means for regulating water/gas transmission, and a separate soil containment means which can be assembled in some of the channels thereby defining a container for the soil. The invention also includes methods of germinating seeds and growing plants using the container of the invention.

18 Claims, 7 Drawing Figures

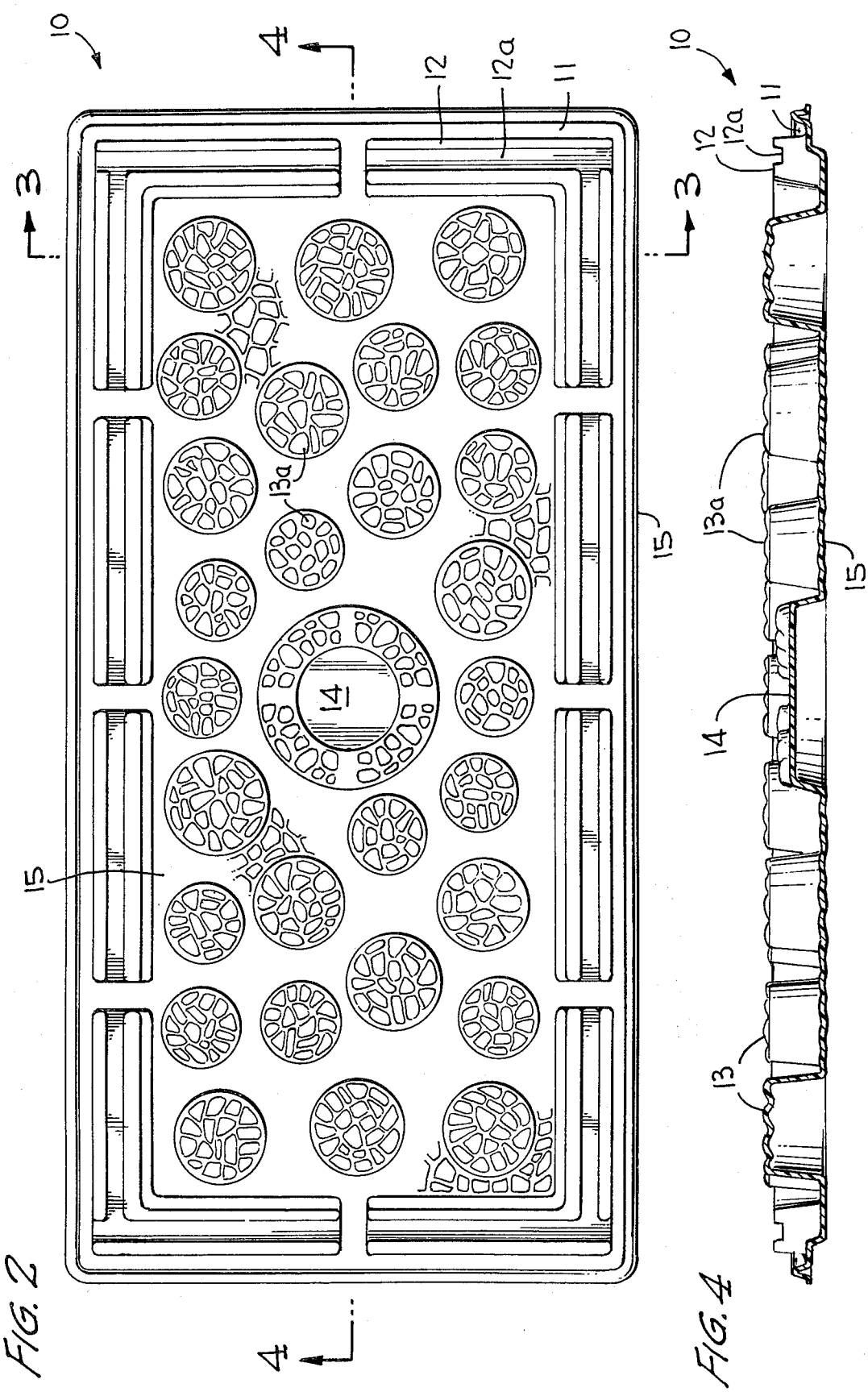

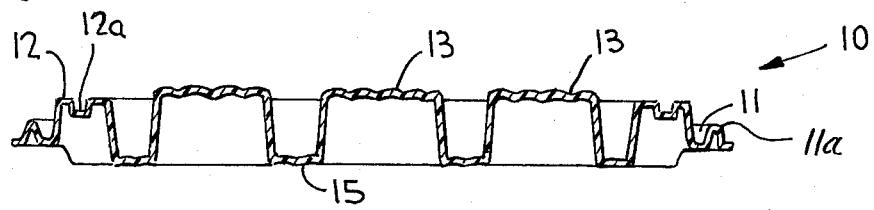
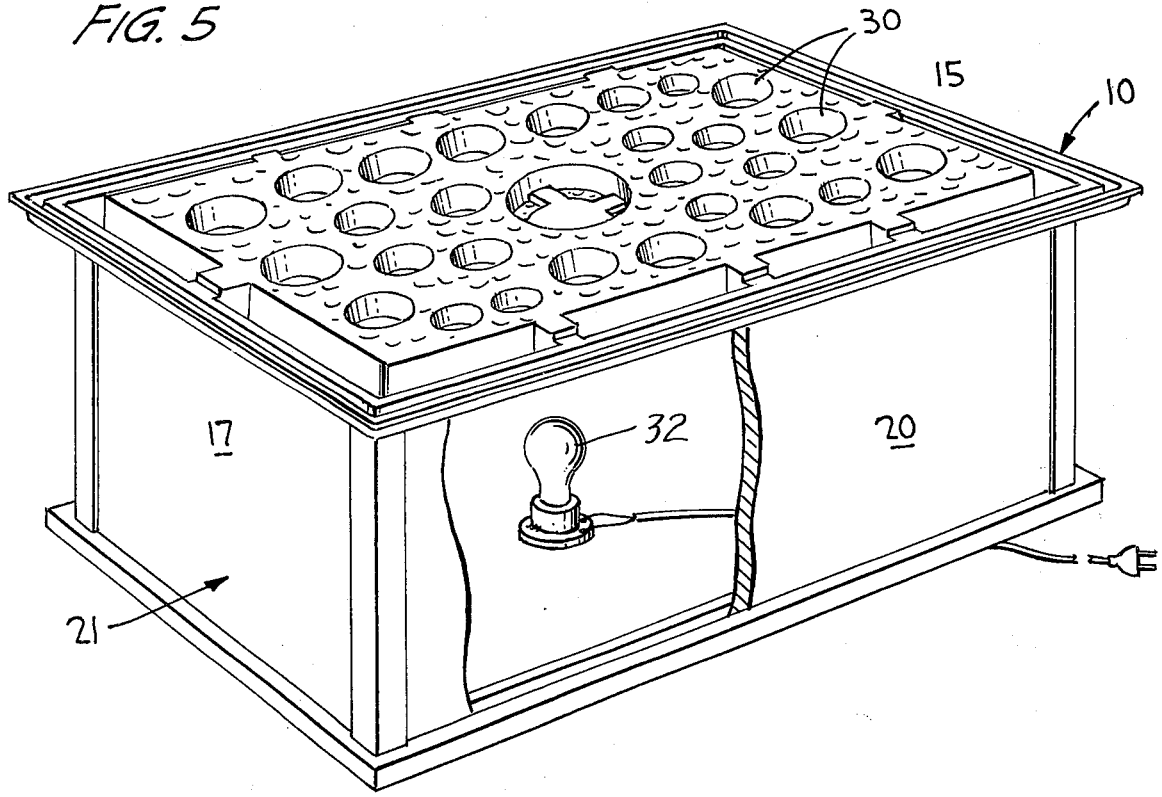

BALANCED BOTANICAL GROWTH CONTAINER

BACKGROUND OF THE INVENTION

Recent consumer research has established that with the shift from farm to urban living, particularly urban living in multiple dwellings, there has developed a basic consumer need to grow things. For example, a birds-eye view of the roof tops and penthouses in most urban areas reveals that a green revolution is now underway.

This desire to care for plants is further intensified by the now recognized consumer need for the constructive use of unstructured time. The growing and caring for plants has been found to be an excellent substantive use of this unstructured time because it can be a rewarding and long term activity.

Unfortunately, there are no low cost containers available commercially today which adequately respond to these container needs. For example, the various planters, containers and the like which are available can generally be described as: (a) expensive, (b) ill-suited for germinating seeds, and growing plants and/or (c) are difficult to disassemble. Most containers available today are either small pots of ceramic or clay materials or expensive wooden planters which generally cannot be purchased unassembled, so they are difficult to move into most multiple dwellings. Furthermore, most of these containers are not water proof and require a separate tray to be placed under them to avoid leaking. Perhaps most important these containers have been designed with little consideration of the plant cultural practices required to obtain satisfactory results. That is, it is almost impossible to maintain balanced growth conditions with respect to water/gas transmission, and temperature control during germinating and/or growth with the planters available on the market today.

The transitory life style of many urban dwellers today requires that planters other than small pots generally be capable of being disassembled so they can be moved. Oftentimes the planters available today are either left behind or moved at great expense. Moreover, the failure to be able to breakdown planters restricts the opportunity to exercise routine root training which is often essential when growing perennials particularly trees and shrubs under planter conditions.

Perhaps, the single greatest drawback of the containers available for plant care today is their cost. That is, it has been established that up to 50 percent of the cost of typical redwood planters available in most garden centers today is attributed to the cost of assembly and shipping. These costs can be reduced significantly. For example, if the containers were sold in a knocked-down state to the consumer – shipping costs would be reduced significantly, particularly if the container components had various stacking features which could reduce volume requirements for shipping. The assembly costs could be avoided altogether by allowing the consumer to assemble the container. It has been found that in most instances the consumer who purchases containers for plant care would often times prefer to use their unstructured time to assemble the unit if given the opportunity, particularly if there is a cost savings involved.

Thus, while the roof top/deck/patio green revolution is well underway the market has yet to respond with a basic container which is low cost, adaptable to the consumer's life style and suitable for providing optimum plant care.

SUMMARY OF THE INVENTION

The present invention is directed to a low cost readily assembled container suitable for supporting plant growth. The container comprises a base and means for soil containment wherein the base is water impermeable, i.e., capable of holding water, and contains integral root control means and channels for water/gas transmission. The base also provides support for the soil containment means.

The ratio of the average mean depth to the average mean diameter of the root control means and the ratio of the average mean depth of the root control means to the average mean depth of the water/gas transmission channel has unexpectedly been found to have a critical, for optimum results, and most positive effect on the growth generating capacity of the container.

Additionally, when the container is provided with a growth regulant means and a barrier to selectively regulate the exchange of gas and water between the container and the atmosphere, optimum results in growth control are obtained.

Advantageously, seed germinating means are provided on the obverse surface of the container base complementary with the root control means. The dual function of the container base, i.e. seed germinating and plant growth is particularly unique and unobvious when considered in light of the unobvious and unexpected results obtained with respect to seed germination, root ball development, plant growth and overall plant vitality.

An advantageous embodiment of the invention is directed to:

A balanced, botanical growth container comprising:
  a. a plastic base having:
    1. a series of germinating/root control means,
    2. an inner channel substantially defining the periphery of said growth container, suitable for receiving and supporting a soil containment means, and
    3. an outer water/gas transmission channel substantially defining the periphery of said base having a series of channels in communication with said germinating/root control means wherein:
  a. the bottom of said inner channel is generally higher than the top of said water/gas transmission channel,
  b. from between about 20 and about 80% surface of said base is comprised of germinating/root control means wherein the ratio of the mean height to the mean diameter of said germinating/root control means is from between about 1:0.5 and about 1:3,
  c. the ratio of the mean depth of the water/gas transmission channel to the mean height of the germinating/root control means is from between about 0.5 to 2 and about 1:1.2, and
  b. separate soil containment means comprising panels which fit into said inner channel thereby defining a container suitable for germination and growth.

In a further embodiment the container is provided with a grow regulant means and a barrier suitable for regulating the exchange of gas and water between the container and the atmosphere.

The method of the invention may be summarized as including:

A method of germinating seeds comprising planting seeds in the germinating means of the container of the invention and placing a heat source in the chamber defined by the soil containment means and the plastic base;

A method of growing plants comprising placing the plants in soil in the container of the invention and regulating the introduction of water into the water/gas transmission means;

A method of germinating seeds comprising planting seeds in the germinating means of the container of the invention, placing a heat source in the chamber defined by the soil containment means/plastic base combination and regulating the exchange of gas and water between the container and the atmosphere by means of a selective barrier, and A method of growing plants comprising placing the plants in soil in the container of the invention regulating the introduction of water, growth regulants, nutrients and trace elements into the container by means of a growth regulant means and regulating the exchange of gas and water between the container and the atmosphere by means of a selective barrier.

A feature of the invention is to provide a low cost, lightweight, easily assembled container suitable for plant growth.

Another feature of the invention is to provide an easily assembled container which can be stacked when not assembled.

A further feature of the invention is to provide a readily assembled container which has a water proof base.

Still another feature of the invention is to provide a container suitable for balanced botanical growth having a growth regulant means.

A further feature of the invention is to provide a container suitable for balanced botanical growth having a barrier means for selectively regulating the exchange of gas and water into and out of the container.

BRIEF DESCRIPTION OF THE DRAWINGS

These and further features of the invention will become apparent from the following description of the invention taken in conjunction with the attached drawings wherein:

FIG. 2 is a plan view of the container base.

FIG. 3 is a sectional view of the base shown in FIG. 2 taken along the line 3—3 illustrating the relationship between the various channel means and the germinating/root control means.

FIG. 4 is a sectional view of the base shown in FIG. 2 taken along line 4—4 illustrating the relationship between the various channel means and the germinating-/root control means.

FIG. 5 is a perspective view of the container assembled illustrating the germinating feature.

DESCRIPTION OF THE PREFERRED EMBODIMENT

Figure 1:
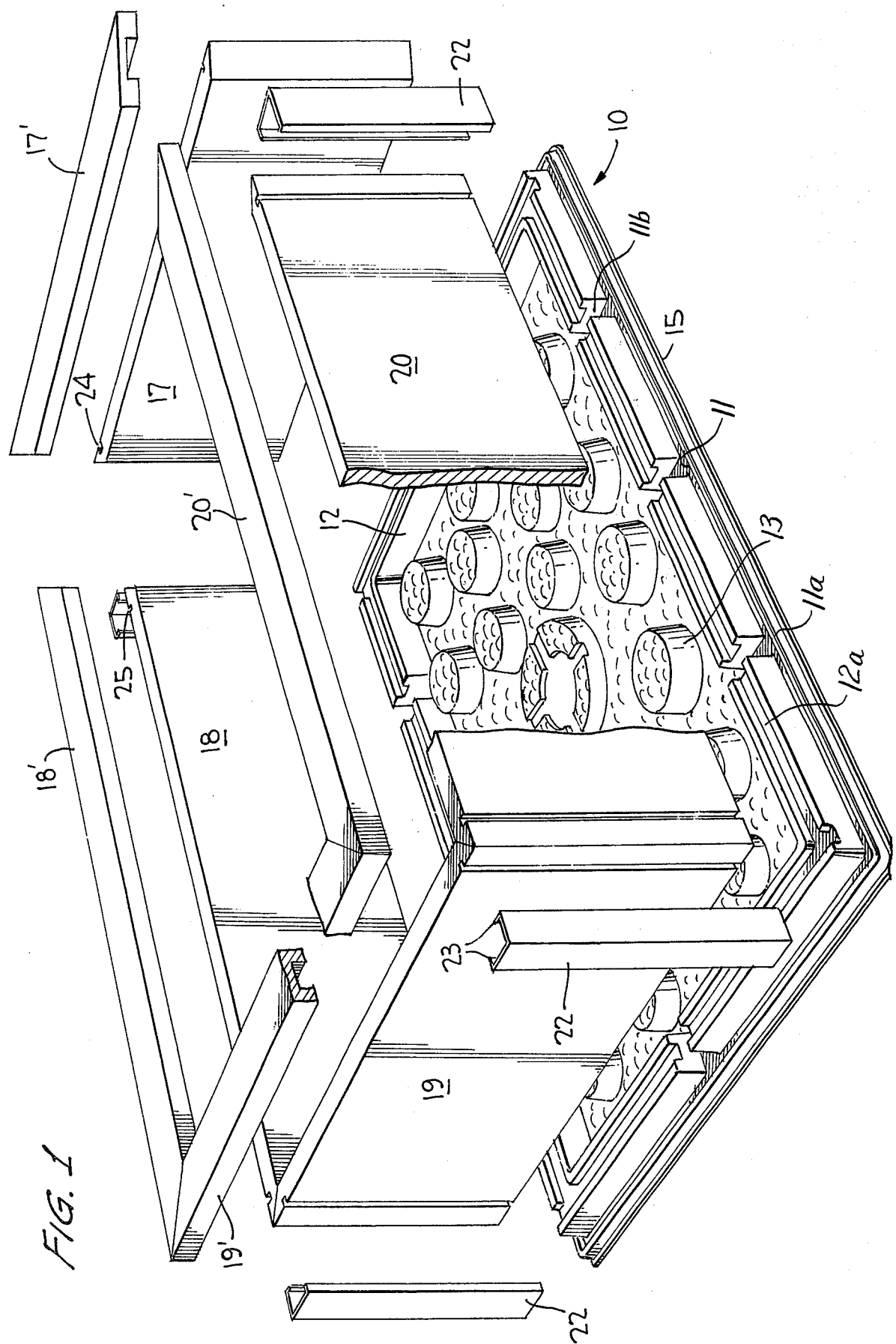
FIG. 1 is an exploded view of a container assembly.

The invention can be more readily understood by reference to the drawings:

Referring to FIGS. 1 and 2, the container base is generally designated as 10 and comprises: water/gas transmission means 11, soil containment support means 12, root control means 13, growth regulant base means 14 and the base proper 15.

Referring to FIGS. 3 and 4, the relationship between water/gas transmission means 11, soil containment support means 12, and root control means 13 is illustrated. A detailed discussion of this relationship is set out below. It has been observed that in order to obtain optimum root development and minimize root rot while maintaining plant vitality and growth it is preferred that the top area 13a, of germinating/root control means 13 generally be higher than top 11a of water/gas transmission means 11. In a preferred embodiment of the invention the base 12a, of soil containment support means 12, is generally higher than the top 11a, of water/gas transmission means 11. In this embodiment the soil containment means is generally kept out of direct contact with water introduced into the container, thereby minimizing root rot and the like.

Figure 6:
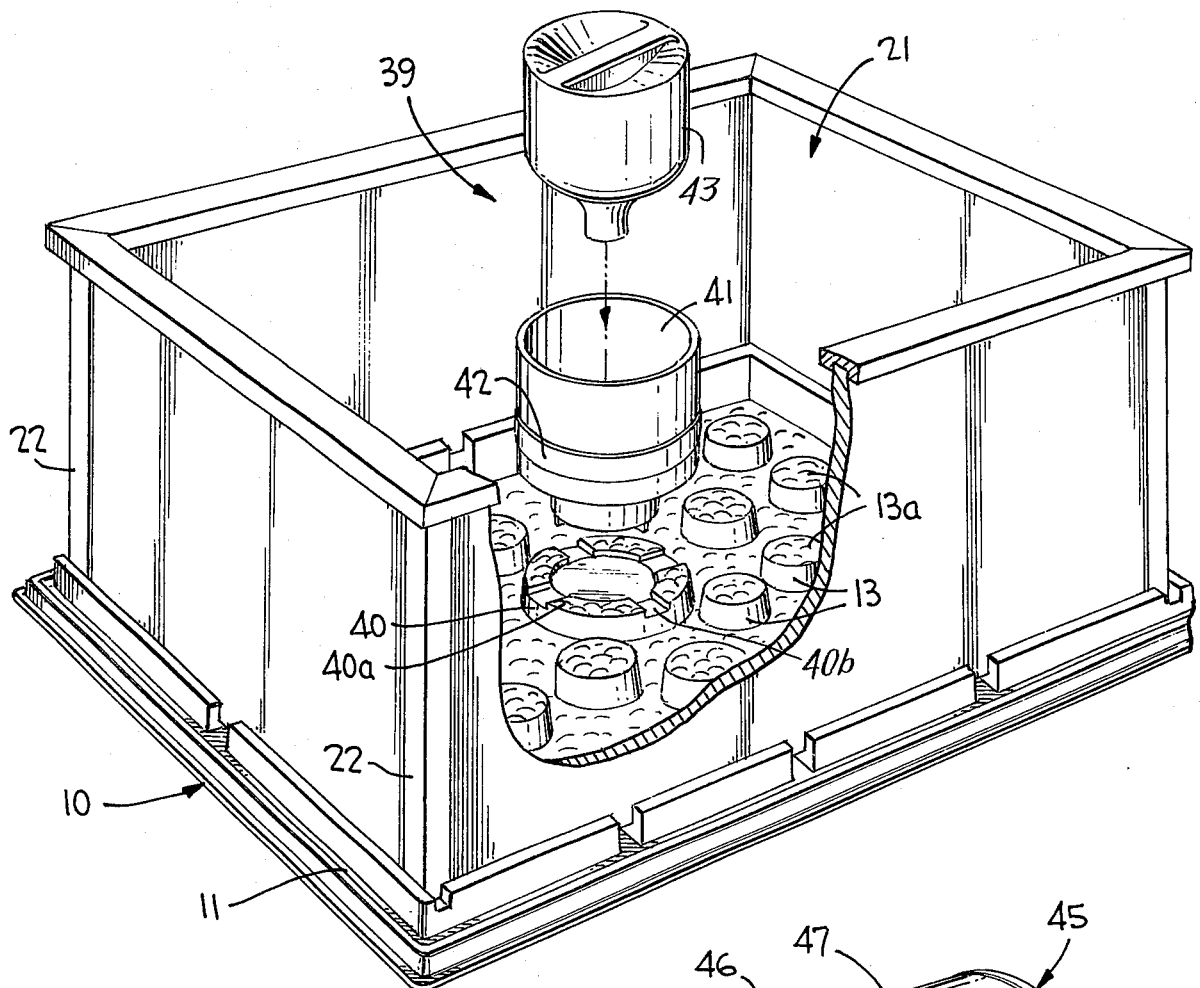
FIG. 6 is a perspective view of the base illustrating the growth regulant feature.

Referring to FIGS. 1, 5 and 6, soil containment means 17, 18, 19, and 20 are shown fitted into soil containment support channel means 12a thereby defining the botanical growth container generally designated as 21. Water/gas transmission channel means 11 is shown outside of soil containment means 20. Soil containment panel means 17, 18, 19, and 20 are provided with coaming means 17', 18', 19', and 20' respectively and corner means 22 to provide a more aesthetic finish to the container while providing the necessary rigidity to the container. The various soil containment panels are held in position by corner means 22 as shown in FIG. 1. It can be appreciated that soil containment means 17, 18, 19, and 20 are maintained above the level of water maintained in water/gas transmission means 11 to minimize the potential of rot while also reducing the leaching and absorbtion of water from the water/gas transmission means, thereby providing optimum control of the botanical growth obtained with the container. Water/gas transmission and communication between the root control means 13 and the channel 11 is provided through the transverse slot means 11b.

Referring to FIG. 1, it is apparent that corner means generally shown as 22 is provided with channel 23 which engages slots 24 and 25 of soil containment means 17 and 18 respectively to provide a rigid assembly of containment means 17 and 18.

Referring to FIG. 5, it is apparent that base 10 shown in FIG. 1 has been turned 180° so that root control means 13 defines germinating means 30 and soil containment means 17, 18, 19 and 20 now define a support for base 11.

In a preferred embodiment it has been found that container 21 provides an excellent temperature control chamber for germinating means 30. That is, a heat source such as a low wattage light bulb 32, see FIG. 5, can be placed inside container means 21 and allowed to generate heat. The relationship of the mean depth to mean diameter of germinating means 30 is critical in obtaining optimum germination. This relationship is discussed in detail below.

Figure 7:
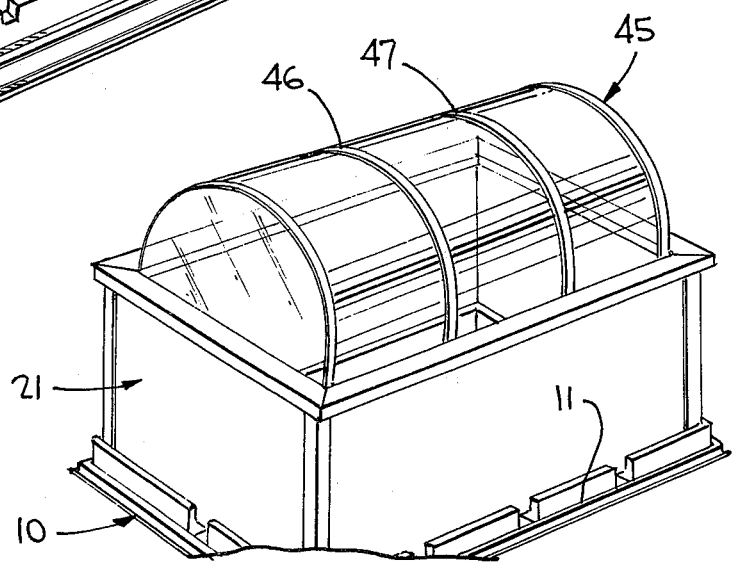
FIG. 7 is a perspective view of the container illustrating means for regulating the gas/water exchange between the container and the atmosphere.

In a preferred embodiment base 10 can be provided with a barrier, not shown, similar to that illustrated in FIG. 7 which regulates the exchange of water and gas between the germinating means and the atmosphere.

Referring to FIG. 6, a preferred embodiment of the invention is shown which includes base 10 provided with growth regulant means base, 40, growth regulant reservoir means 41 and growth regulant flow control means 42. The top 40a of growth regulant means base 40 is generally below the top area 13a of root control means 13, to minimize root rot and provide optimum root development. Reservoir means 41 is preferably open at the top to allow water, growth regulants, nutrients and trace elements to be introduced therein. Reservoir means 41 sits on support means 40 which is provided with channels 40b which allow some of the contents of reservoir 41 to be introduced into container 21 in a manner similar to that of a chicken waterer. Reservoir 41 is further provided with growth regulant flow control means 42 which is a series of openings in the reservoir wall in combination with a fibrous material such as paper cartridge 43 which functions to meter the contents of the reservoir into container 21. It is understood that container 21 will be provided with soil in order for growth regulant means 39 to function effectively.

Referring to FIG. 7, container 21 is provided with barrier means 45. Barrier means 45 is supported by stays 46 and 47 which support the barrier. The barrier is a synthetic plastic material which regulates the transmission of water and gas between container 21 and the atmosphere. It has been observed that barrier 45 in combination with water/gas transmission means 11 and growth regulant means 39, shown in FIG. 6 provides unexpected and unobvious results in botanical growth which heretofore has been difficult to obtain.

The balanced botanical growth obtained with the container of the invention is defined as optimum seed germinating plant growth and root development obtained under conditions of controlled water/gas transmission to the root area. In a preferred embodiment this balanced botanical growth is further improved by regulation of water/gas exchange between the container and the atmosphere.

To obtain balanced botanical growth under seed germinating conditions the ratio of the mean depth to the mean diameter of the germinating/root control means is from between about 1:0.5 and about 1:3. In a preferred embodiment this ratio is about 1:1. It has been found that at these ratios the minimum amount of soil is required for optimum seed germination while the loss of water due to evaporation from the soil surface/air interface is minimized.

In a preferred embodiment a heat source is provided below base 10 of container 21 as described in the discussion of FIG. 5. Base 10 provides optimum thermal conductivity to the entire surface of germinating means 30, to provide a balanced temperature which can be regulated by the heat obtained from the heat source.

When base 10 is provided with a barrier means 45, such as shown in FIG. 7, the transmission of gas and water between the container and the atmosphere can be regulated to further optimize seed germinating conditions.

To obtain balanced botanical growth under plant growth and root control from between about 20 and about 80% of the base surface is comprised of root control means. In a preferred embodiment of the invention from between about 40 and about 60% of the base is comprised of root control means. In addition, the ratio of the mean depth of the water/gas transmission channel to the mean height of the root control means is from between about 0.5 to 2 and about 1:1.2.

In a preferred embodiment of the invention the ratio of the mean depth of the water/gas transmission channel to the mean height of the root control means is from between about 1:1 and 1:2.

It has been observed that root development is optimum and root rot is minimized when a substantial portion of the base surface is comprised of root control means which function similar to rocks in conventional planters. It has been observed that the relationship between height of the root control means and the water/gas transmission channel is critical to minimizing root rot.

The water/gas transmission means provides a means of introducing water under controlled conditions into the container. A substantial portion of the plants roots are maintained above the water level in the water/gas transmission means by the root control means. Water is transferred from the water/gas transmission means to these roots by means of the soil. Additionally, gas necessary for optimum plant development is introduced into the container by the water/gas transmission means.

In addition to the various dimensional relationships required for balanced botanical growth it has been found that the finish on the base is critical to optimum root development. For example, when base 10 is used for seed germinating as shown in 5, seed germinating means 30 provides an optimum surface for root development with minimum adverse effect on root cilia when the plant is removed. That is, when a root ball is removed from germinating/root control means 30 there is minimum damage to the root cilia at the soil-germinating/root control means interface because of the smooth surface of the germinating/root control means and the pH of this surface. The smooth surface of germinating means 30 preferably has a neutral pH which is desirable for root cilia development. The smoothness of germinating surface 30 is preferred since there is little irregularity for the cilia to engage.

The base containing the germinating/root control means is preferably made from a plastic material such as polyethylenes, polypropylenes, polystyrenes, polyesters, alkyds, polyurethanes, acetate, epoxy, nitrites, acetals, acrylics, furans, phenolics, polyamides, polyimides, polycarbonates and mixtures thereof.

In a particularly preferred embodiment the base is molded from these plastic materials by means of vacuum forming or injection molding. These methods of forming the base have been found most preferable with respect to providing a smooth, neutral surface which is most beneficial to root cilia development.

It has further been observed that the root ball contained in germinating means 30 can be removed most effectively with minimum damage to root cilia by refraining from watering the soil for up to 24 hours prior to plant removal.

In another embodiment of the invention the plastic material is mixed with various additives to provide: (a) a smooth surface, substantially free from irregularities, such as silicones, (b) a substantially neutral pH, (c) ultraviolet absorbers including various pigments, (d) strengthening agents such as glass particles and the like, and (e) thermal conductive properties by adding conductive materials such as metal particles like iron fines.

As can be appreciated from the description of the growth regulant means, illustrated in FIG. 6, the growth regulant reservoir provides a continuing regulated flow of water, nutrients, growth regulants and trace elements into the soil of the container. The nutrients include various phosphates, nitrates, carbonates and ammonium salts as well as various organic materials. The growth regulants include various synthetic materials such as 2,4-Dichlorophenoxyacetic acid used in concentrations of less than 0.1 percent by weight. 2,4-D in larger concentrations is a widely used selective weed killer. Various emulsifiers are also useful as growth regulants. Elements useful in these compositions include: copper, bismuth, lead, codmium, tin, antimony, manganese, titanium, zirconium, zinc, nickel, cobalt and barium.

The growth regulant reservoir can have a capacity ranging from between about 1 quart and about 3 gallons per cubic yard of volume of the container. The growth regulant flow control means of the reservoir has the capacity to regulate the flow of liquid into the soil of the container at a rate from about 0.1 gallon per day to about 3 gallons per day. The growth regulant flow control means comprises a series of apertures in the reservoir generally located below the top of the germinating/root control means. These apertures in combination with a wicking means wrapped around the reservoir in the area of the apertures functions to meter the composition contained in the reservoir into the soil around the reservoir. It has been observed that if the reservoir is positioned in the general area of the geometric center of the base that the growth regulant composition can be effectively metered to the plants in the container at a fairly well controlled rate and in a generally uniform concentration.

For use as a balanced botanical growth container side panels 17, 18, 19 and 20 are assembled by setting them upon edge, mitred corner to mitred corner and inserting the corner lock means 22. The base 15 is then placed onto the assembled panel means cup side up, as illustrated in FIG. 5, to enable use of the germinating cup means 30, and appropriately fastened thereto. The specially sized germinating cup means 30 are filled three-fourths full of potting soil, three to six seeds sowed in each cup and watered carefully. An ordinary 50 watt bulb, shown as 32 in FIG. 5, is placed beneath the base 15. The seeds will germinate from the steady 75°– 85°F warmth from below.

When the seeds have developed to transplanting size, four to eight inches height, depending on the variety, the soil in the cup means 30 is permitted to dry out slightly and the plant and root ball removed. After cleaning the germinating cups, the entire container is merely turned over for use for plant growth. The container is filled with planter soil mix or a suitable planting soil and the seedlings planted therein and cultivated, fed and watered as usual.

The plants are kept safe from over-watering by the root control means 13 and the water/gas transmission channel means. If kept outdoors, even excess rain water is not harmful since it drains through the aeration slots 11b into the channel. Yet, essential oxygen and carbon dioxide pass through to the roots where required. Growth regulation may be obtained through the growth regulant means previously described.

The container of the invention can be readily assembled and knocked down. When unassembled, the container base can be stacked into other similar bases thereby reducing the space required for storage and shipping. It has been found that the bases tend to stack more readily if the germinating/root control means of the base are molded such that the angle of the side wall of the means is between 7° and 10° less than 90°. In a preferred embodiment of the invention all of the germinating/root control means are provided with this stacking feature.

The following are illustrative examples showing various alternative embodiments of this invention.

| Example No. | Base Material | | |
|---|---|---|---|
| | Type of plastic (method of molding) | pH | Additives in Plastic |
| 1 | Polystyrene | 7 | Ultraviolet absorbers polysiloxane at .1% by wgt. |
| 2 | Polypropylene (injection molded) | 6.9 | Black pigment |
| 3 | Polyurethane (casted) | 7.1 | Black pigment |
| 4 | Polyethylene (vacuum formed) | 7 | Glass fibers, ultraviolet absorbers |
| 5 | Epoxy (cast) | 7.0 | Ultraviolet absorbers, thermal conductors (iron filings) |
| 6 | Phenolic (cast) | 7.0 | Thermal conductors & glass fibers added |
| 7 | Polystyrene (vacuum formed) | 7.0 | Ultraviolet absorbers |
| 8 | Polycarbonate (injection molded) | 6.9 | Base coated with a waterproof finish |

TABLE I

PLANT GROWTH

| Example No. | Base Conditions | | | Growth Regulant Means | |
|---|---|---|---|---|---|
| | Percent of base surface comprising germinating/root control means | Ratio of mean height to mean diameter of germinating/root control means | Ratio of mean depth of water/gas transmission channel to mean height of germinating/root control means | Reservoir capacity in gal. & rate of release | Growth regulate composition (in % by wgt.) |
| 1 | 50 | 1:1 | 1:2 | (in gal./day) 1 (.3) | Water (99:3) 2,4-D (.1) Trace elem.(.1) Plant nutrients (.5) |
| 2 | 60 | 1:3 | 0.5:2 | 3 (.1) | Water (99.8) Trace elem.(.1) Plant nutrients (.1) |
| 3 | 80 | 1:1.5 | 0.5:1.5 | 2 (.4) | Water (98.9) 2,4-D (.05) |

TABLE I-continued

PLANT GROWTH

| Example No. | Base Conditions | | | Growth Regulant Means | |
|---|---|---|---|---|---|
| | Percent of base surface comprising germinating/root control means | Ratio of mean height to mean diameter of germinating/root control means | Ratio of mean depth of water/gas transmission channel to mean height of germinating/root control means | Reservoir capacity in gal. & rate of release | Growth regulate composition (in % by wgt.) |
| 4 | 20 | 1:1.3 | 0.5:1.3 | 1 (.2) | Plant nutrients (1.0) Trace elem.(.05) Water (99.5) Plant nutrients (0.5) |

TABLE II

SEED GERMINATING

| Example No. | Base Conditions | | Supplemental Growth Control | | Observations |
|---|---|---|---|---|---|
| | Ratio of mean depth to mean diameter of germinating means | Surface condition (root cilia cond.) | Type of Heat Source | Water/gas exchange means | |
| 5 | 1:1 | Smooth, generally free from irregularities (little damage to cilia upon removal of plant) | 15 watt bulb placed in container | Barrier film placed over container | Rate of germination increased substantially over seeds planted in conventional container. Balanced growth obtained. |
| 6 | 1:2 | Generally free from irregularities | 25 watt bulb placed in container | None | Rate of germination & root development rated better than control. Balanced growth obtained. |
| 7 | 1:1 | Smooth | 15 watt bulb placed in container | None | Seed germination & root development controlled. |
| 8 | 1:2 | Very Smooth | None | None | Suitable seed germination obtained. |

We claim:

1. A plant growth container eliminating plant overwatering and reducing root rot comprising:
    a water impermeable base having:
    an inner channel substantially defining the periphery of the growth container, capable of receiving and supporting a soil containment means,
    a series of root control means located on the base surface within the inner channel, said root control means extending upwardly from said base to a predetermined height defining an upper plane, and
    an outer water/gas transmission channel substantially defining the periphery of the base having a plurality of channels in communication with the root control means,
    the bottom of the inner channel and the upper plane of said root control means being generally higher than the top of the water/gas transmission channel, and
    separate soil containment means comprising panels which fit into the inner channel thereby defining a container suitable for growth.

2. A plant growth container according to claim 1 wherein:
    from between about 20 and about 80 percent of the base is comprised of root control means and the ratio of the mean depth of the water/gas transmission channel to the mean height of the root control means is from between about 0.5 to 2 and about 1:1.2.

3. A plant growth container according to claim 1 wherein the obverse of the surface of the base having the root control means contains seed germinating means.

4. A plant growth container according to claim 3 wherein the ratio of the mean depth to the mean diameter of the germinating means is from between about 1:0.5 and about 1.3.

5. A plant growth container according to claim 3 wherein the germinating and root control means are integrally formed as part of the base and are one and the same.

6. A plant growth container according to claim 5 wherein the germinating/root control means and inner and outer channel means are formed so as to enable stacking of a plurality of bases.

7. A balanced, botanical growth container comprising:
    a. a water impermeable base having:
        1. a series of germinating/root control means,
        2. an inner channel substantially defining the periphery of said growth container, suitable for receiving and supporting a soil containment means, and
        3. an outer water/gas transmission channel substantially defining the periphery of said base having a series of channels in communication with said germinating/root control means wherein:
a. the bottom of said inner channel is generally higher than the top of said water/gas transmission channel,
b. from between about 20 and about 80 percent of the surface of said base is comprised of germinating/root control means wherein the ratio of the mean height to the mean diameter of said germinating/root control means is from between about 1:0.5 and about 1:3,
c. the ratio of the mean depth of the water/gas transmission channel to the mean height of the germinating/root control means is from between about 0.5 to 2 and about 1:1.2 and
b. separate soil containment means comprising panels which fit into said inner channel thereby defining a container suitable for germination and growth.

8. A container according to claim 7 wherein the base is black, vacuum formed, high density, polystyrene containing ultraviolet absorbers.

9. A container according to claim 7 wherein at least some of the germinating/root control means are provided with a stacking feature.

10. A container according to claim 9 wherein said stacking feature of the germinating/root control means comprises an angle up to 10 percent from normal.

11. A container according to claim 7 wherein the base is provided with integral growth regulant support means positioned below the top of said germinating-/root control means.

12. A container according to claim 11 wherein said growth regulant means comprises a support means integral with said base and positioned in the general vicinity of the geometric center of said base provided with a reservoir means and a liquid flow control means positioned above said germinating/root control means.

13. A container according to claim 7 provided with a barrier to selectively regulate the exchange of gas and water between the container and the atmosphere.

14. A container according to claim 7 wherein the plastic base is made from a material selected from the group consisting of polyethylenes, polypropylenes, polystyrenes, polyesters, alkyds, polyurethanes, acetates, epoxies, nitrites, acetals, acrylics, furans, phenolics, polyamides, polyimides, polycarbonates and mixtures thereof.

15. A container according to claim 13 wherein the plastic base has a substantially neutral pH and is supportive of root cilia.

16. A container according to claim 7 wherein said soil containment means is made from redwood.

17. A method of germinating seeds comprising:
I. planting seeds in the germinating means of a balanced, botanical growth container comprising:
a. a plastic base having:
1. a series of germinating/root control means,
2. an inner channel substantially defining the periphery of said growth container, suitable for receiving and supporting a soil containment means, and
3. an outer water/gas transmission channel substantially defining the periphery of said base having a series of channels in communication with said germinating/root control means wherein:
a. the bottom of said inner channel is generally higher than the top of said water/gas transmission channel,
b. from between about 20 and about 80 percent of the surface of said base is comprised of germinating/root control means wherein the ratio of the mean height to the mean diameter of said germinating/root control means is from between about 1:0.5 and about 1:3,
c. the ratio of the mean depth of the water/gas transmission channel to the mean height of the germinating/root control means is from between about 0.5 to 2 and about 1:1.2, and
b. separate soil containment means comprising panels which fit into said inner channel thereby defining a container suitable for germination and growth.
II. placing heat source in the chamber defined by the soil containment means and the plastic base.

18. A method of growing plants comprising:
I. placing the plants in the soil of a balanced botanical growth container comprising:
a. a plastic base having:
1. a series of germinating/root control means,
2. an inner channel substantially defining the periphery of said growth container, suitable for receiving and supporting a soil containment means, and
3. an outer water/gas transmission channel substantially defining the periphery of said base having a series of channels in communication with said germinating/root control means wherein:
a. the bottom of said inner channel is generally higher than the top of said water/gas transmission channel,
b. from between about 20 and about 80 percent of the surface of said base is comprised of germinating/root control means wherein the ratio of the mean height to the mean diameter of said germinating/root control means is from between about 1:0.5 and about 1:3,
c. the ratio of the mean depth of the water/gas transmission channel to the mean height of the germinating/root control means is from between about 0.5 to 2 and about 1:1.2, and
b. separate soil containment means comprising panels which fit into said inner channel thereby defining a container suitable for germination and growth,
c. a growth regulant means integral with said base and provided with a reservoir means and a liquid flow control means and
d. a barrier to selectively regulate the exchange of gas and water between the container and the atmosphere and
II. periodically introducing water, growth regulants, nutrients and trace elements into the reservoir of said growth regulant means.

* * * * *